(12) United States Patent
Fasshauer et al.

(10) Patent No.: US 6,933,714 B2
(45) Date of Patent: Aug. 23, 2005

(54) METHOD AND APPARATUS FOR MEASURING THE IMPEDANCE OF AN ELECTRICAL ENERGY SUPPLY SYSTEM

(75) Inventors: Heiko Fasshauer, Hessisch-Lichtenau (DE); Michael Viotto, Kassel (DE)

(73) Assignee: Institut fuer Solare Energieversorgungs-technik (ISET) Verein an der Universitaet Gesamthochschule Kassel e.V., Kassel (DE)

( * ) Notice: Subject to any disclaimer, the term of this patent is extended or adjusted under 35 U.S.C. 154(b) by 0 days.

(21) Appl. No.: 10/370,147

(22) Filed: Feb. 19, 2003

(65) Prior Publication Data

US 2003/0164695 A1 Sep. 4, 2003

(30) Foreign Application Priority Data

Feb. 19, 2002 (DE) ........................ 102 07 856
Nov. 26, 2002 (DE) ..................... 202 18 473 U

(51) Int. Cl.⁷ .................. G01R 23/16; G01R 21/06
(52) U.S. Cl. ......................... 324/76.21; 702/60
(58) Field of Search ................. 324/76.21, 600, 324/603, 605, 522, 525; 702/60, 70, 77

(56) References Cited

U.S. PATENT DOCUMENTS

| | | | | |
|---|---|---|---|---|
| 3,947,759 A | * | 3/1976 | Briggs | 324/509 |
| 3,995,200 A | * | 11/1976 | Stolarczyk | 361/48 |
| 4,346,422 A | * | 8/1982 | Inzoli | 361/62 |
| 4,878,185 A | * | 10/1989 | Brand et al. | 702/70 |
| 5,391,144 A | * | 2/1995 | Sakurai et al. | 604/22 |
| 5,450,328 A | * | 9/1995 | Janke et al. | 702/65 |
| 5,818,245 A | * | 10/1998 | Allfather | 324/707 |
| 6,208,945 B1 | | 3/2001 | Shikata | |
| 2002/0188183 A1 | * | 12/2002 | Kusakabe et al. | 600/300 |

FOREIGN PATENT DOCUMENTS

| | | |
|---|---|---|
| DE | 36 00 770 A1 | 11/1986 |
| DE | 195 04 271 C1 | 2/1996 |
| DE | 195 22 496 C1 | 10/1996 |
| DE | 100 06 443 A1 | 10/2001 |
| EP | 0 600 726 A | 6/1994 |

OTHER PUBLICATIONS

Pflier J. :"Elektrische Messgeraete Und Messverfahren" 1978, Springer Verlag, DE XP002252012 4 Auflage, pp. 141–142.

* cited by examiner

*Primary Examiner*—Anjan Deb
*Assistant Examiner*—Hoai-An D. Nguyen
(74) *Attorney, Agent, or Firm*—Michael J. Striker

(57) ABSTRACT

The invention relates to a method and an apparatus for measuring the impedance of an energy supply system at a rated frequency by impressing a testing current (3) into the system and measuring (4) the resulting changes in a system current and a system voltage. According to the invention, the system current and the system voltage are measured during a first preselected time interval (T1) without impressing of the testing current and are measured during a second preselected time interval (T2) with the impressing of the testing current. The testing current is composed of at least one periodic signal with at least one testing frequency (f1, f2) that deviates from the rated frequency. Based on the measured system currents and system voltages, a Fourier analysis is used to determine a resulting impedance for the testing frequency (f1, f2). The impedance of the energy supply system at the rated frequency is derived from the impedance obtained for the testing frequency (f1, f2) (FIG. 1).

9 Claims, 2 Drawing Sheets

Figure 1:
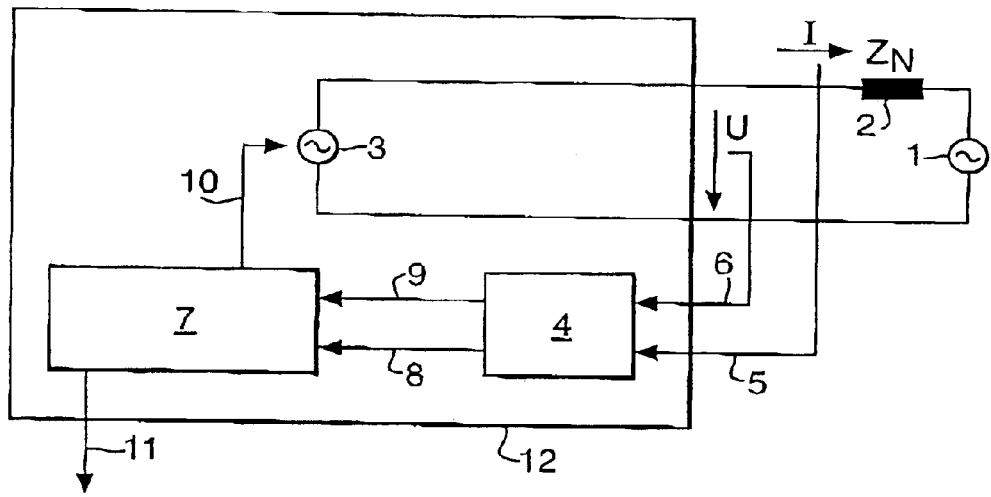

METHOD AND APPARATUS FOR MEASURING THE IMPEDANCE OF AN ELECTRICAL ENERGY SUPPLY SYSTEM

TECHNICAL FIELD

The invention relates to a method and an apparatus for measuring the impedance of an electric energy supply system, i.e. an electricity utility (public) grid or system, at a rated (nominal) frequency by impressing a testing current into the grid or system and measuring the resulting changes in the system current and the system voltage.

BACKGROUND OF THE INVENTION

In the operation of electricity utility (or public) grids, hereinafter also called electrical energy supply systems or simply "systems", it is occasionally desirable to be able to switch off the entire system or parts thereof for all consumers or individual consumers or to maintain a switched-off or disconnected condition after a failure or breakdown (loss of mains) in order to assure a voltage-free state for carrying out maintenance or repair work. This is not easily possible if the grid or system is supplied not only by a central energy supply plant, but also by decentralized voltage sources such as photovoltaic plants, since even in the event that an operator of the central plant executes a system shutdown or the like, these decentralized voltage sources continue to supply energy into the system and therefore lead to a local island formation (islanding).

When there are decentralized voltage sources, which, in the event of a system disconnection or the like, are not sufficient to cover the existing energy demand and therefore in particular suffer a drop in voltage, an undesirable island formation can be avoided by monitoring the voltage and automatically shutting down the relevant decentralized plant if the voltage falls below a predetermined minimum voltage. However, if the decentralized voltage source is in a position to continue maintaining the system voltage within strict tolerances with regard to amplitude and frequency even in the event of a partial or total outage or shutdown of essential components, then the above-described monitoring method alone would not be able to cause the decentralized voltage source to shut down.

In order to prevent local islanding from being produced and posing a threat to people and/or electrical systems even in such a case, methods and apparatuses of the type described at the beginning have become known. They serve the purpose of detecting unusual impedance changes in the public grid and shutting down associated decentralized voltage sources when critical values are reached. As a rule, a shutdown is required only if an impedance increase of 0.5 Ω or more (VDE 0126) occurs in the system. It is assumed that such impedance changes do not occur during normal system operation and are therefore characteristic of the outage or the desired shutdown of a transformer station or the like. A further requirement is that the shutdown occurs within a period of at most five seconds after the shutdown or outage of the system. This makes a continuous or quasi-continuous monitoring and measurement of the system impedance necessary.

With the use of known methods and apparatuses of the types mentioned at the beginning, either high and/or pulse-shaped testing currents with system frequency are fed into the system or testing impedances in the form of capacitors or transformers are connected into the system in rapid succession in order to obtain information from the thus modified system currents and system voltages about the system impedance, which is usually dependent on the frequency (DE 36 00 770 A1, DE 195 04 271 C1, DE 195 22 496 C1, DE 100 06 443 A1). However, such methods and apparatuses are accompanied by a variety of undesirable problems. For example, if it is necessary to use a comparatively high, possibly pulse-shaped testing current in order to analyze the system voltage with regard to its base or fundamental frequency or its harmonic oscillations, then a powerful interference is disadvantageously produced in the system voltage, which can lead to an erroneous interpretation of measurement results. On the other hand, the use of a test impedance, for example, requires a costly set of power electronics. Finally, if broadband testing currents are provided, then it is necessary to analyze the system voltage over a larger frequency spectrum, thus requiring the provision of substantial computing power and therefore high-quality microprocessors or digital signal processors. Apart from this, a broadband testing current causes so many undesirable interferences in the system that it is hardly possible to distinguish the expected test response from among these interferences.

SUMMARY OF THE INVENTION

Based on this prior art, an object of the present invention is to embody the method and apparatus described above in such a way that the measurement of the system impedance generates only slight interferences in the system.

A further object of the invention is to provide a method and an apparatus for measuring the impedance of an electrical energy supply system in such a manner that the impedance can be determined with sufficient accuracy even when there are interferences in the system voltage and when the system frequency is not constant.

Yet a further object of the present invention is to provide a method and an apparatus which make possible an automatic measurement of the impedance of an electrical energy supply system with in a reliable, easy and unexpensive manner.

The method according to this invention comprises the steps of measuring said system current and said system voltage during a first preselected time interval (T1) without the impressing of said testing current and during a second preselected time interval (T2) with the impressing of said testing current, composing said testing current of at least one periodic signal with at least one testing frequency (f1, f2) that deviates from said rated frequency, using, based on said measured system currents and system voltages, a Fourier analysis to determine a resulting impedance for said testing frequency (f1, f2) and deriving said impedance of said energy supply system at the rated frequency from said impedance obtained for said testing frequency (f1, f2).

The apparatus of this invention for measuring the impedance of an energy supply system at a rated frequency comprises means for impressing a testing current into said system, a measuring device for measuring a system current, a system voltage and changes in said system current and said system voltage caused by the impressing of said testing current, and an evaluation unit connected to said measuring device, wherein said system current and said system voltage are measured during a first preselected time interval (T1) without the impressing of said testing current and during a second preselected time interval (T2) with the impressing of said testing current, said testing current is composed of at least one periodic signal with at least one testing frequency (f1, f2) that deviates from said rated frequency, a Fourier analysis is used, based on said measured system currents and system voltages, to determine a resulting impedance for said testing frequency (f1, f2) and the impedance of said energy supply system at the rated frequency is derived from the impedance obtained for said testing frequency (f1, f2).

The invention has the advantage that due to the measurement of the system voltage and system current with at least one frequency that deviates from the system frequency, for example with an intermediate harmonic or interharmonic frequency, the influences of interference in the system voltage and the system frequency are to a large extent reduced. In addition, comparatively low testing currents that are continuous during the testing interval can be used, which do not cause any interference in the system or cause any undesirable harmonic oscillations. It is also possible to largely integrate the components, which are required to carry out the method according to the invention, into a voltage source that is parallel to the system and is present anyway, which permits the apparatus according to the invention to be embodied in a particularly inexpensive fashion overall.

Other advantageous features of the invention ensue from the dependent claims.

The invention will be explained in detail below through exemplary embodiments in conjunction with the accompanying drawings.

Figure 2:
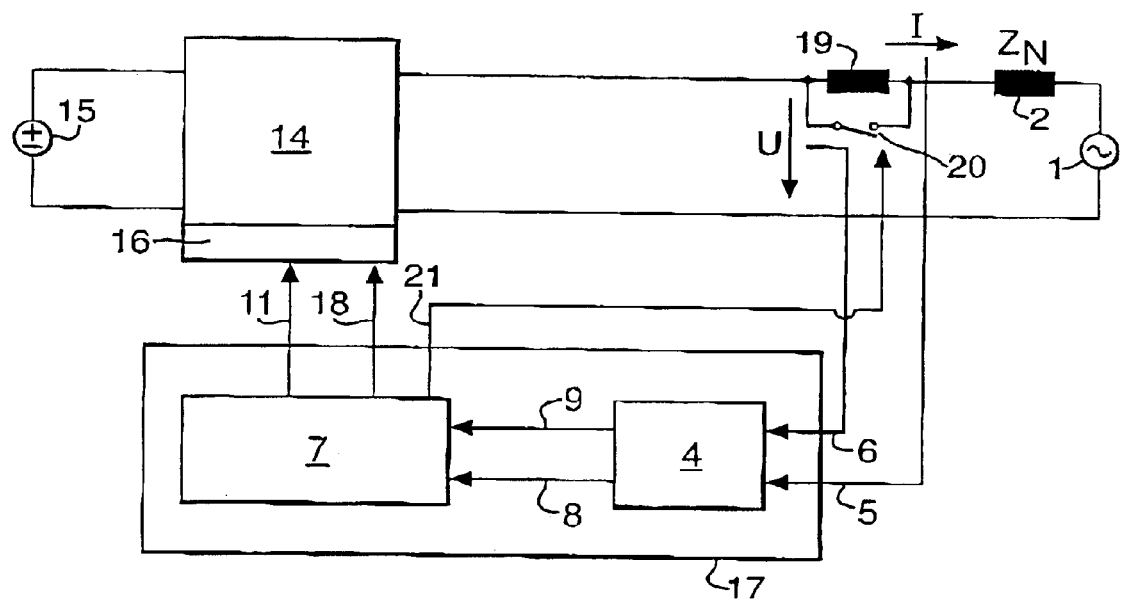
Figure 3:
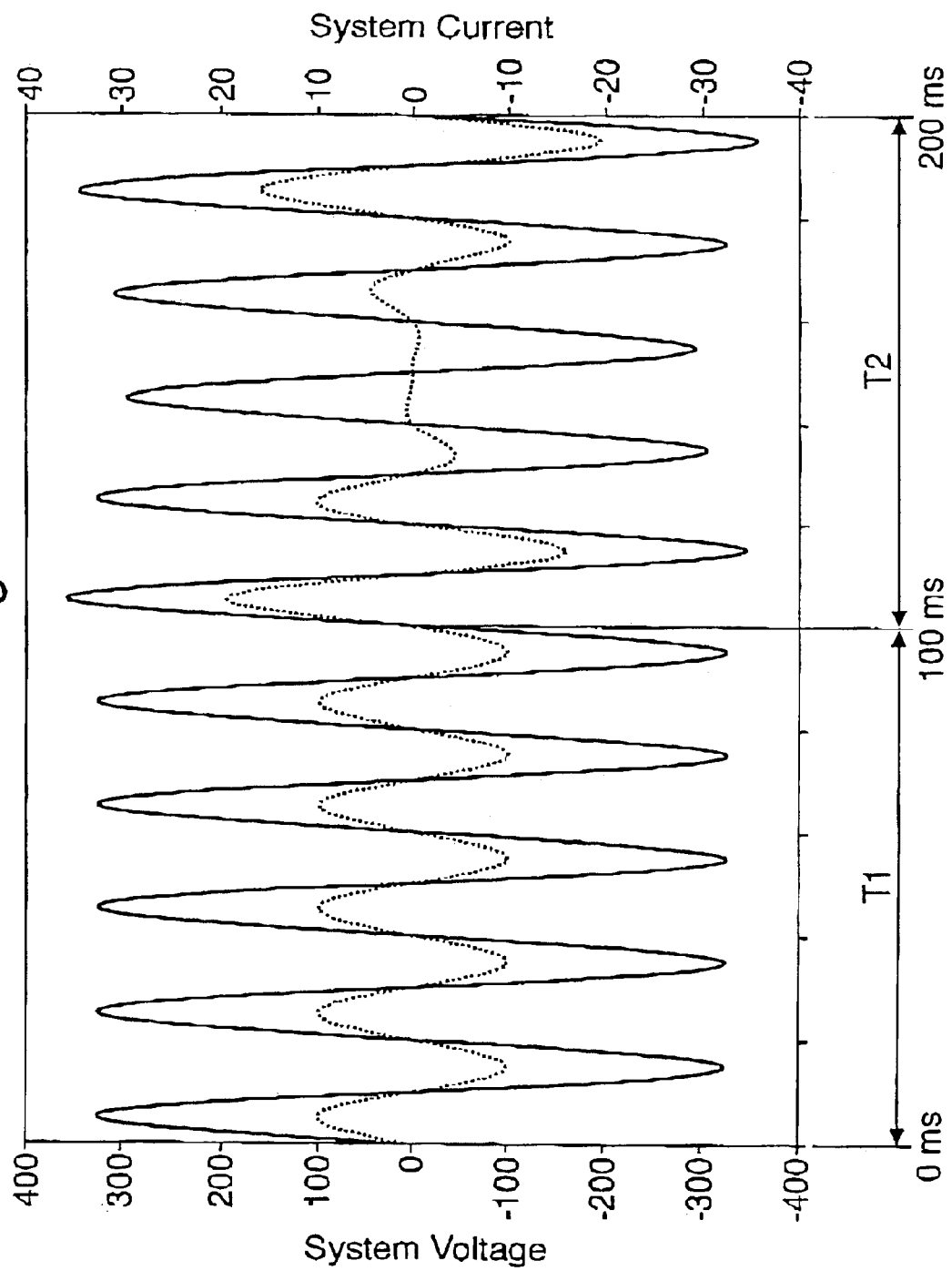

FIG. 1 shows an exemplary embodiment of the apparatus according to the invention, in the form of a simplified block circuit diagram;

FIG. 2 FIG. 2 shows a view similar to the one shown in FIG. 1 of a particularly inexpensive variant of the apparatus according to the invention, which uses components that are present anyway e.g. in a static converter; and FIG. 3 schematically depicts the progression or characteristic of the system voltage and the system current during a complete testing interval using the method according to the invention.

FIG. 1 schematically depicts a conventional electrical energy supply system or electricity public grid (e.g. 230 $V_{\mathit{eff}}$, 50 Hz) with a central alternating current source 1 and an impedance 2 with the value $Z_N$, which among other things, is due to a number of consumers, not shown, being connected to the system in parallel. According to FIG. 1, the apparatus according to the invention includes a controllable alternating current source 3, which can also be connected into the system at a system connection, and which can impress a testing current into the system, as well as a measuring device 4 with two inputs 5 and 6, and an evaluation unit 7. The inputs 5 and 6 of the measuring device 4, which are connected to the system in a suitable manner, are used in an intrinsically known manner to detect and preprocess measurement values for the system current (input 5, arrow I) and the system voltage (input 6, arrow U). A "preprocessing" of the obtained measurement values is understood here, for example, to mean that the measured voltage of for example 325 V is reduced to a value suitable for measurement, processing, and control purposes, for example 10 V, is galvanically separated from the system for safety reasons, for example with optical or magnetic means, is filtered as needed, and is converted to a digital value—possibly with the aid of an analog/digital converter—if an analog processing of the measurement signals is undesirable. The measurement values obtained for the system current can be processed in a corresponding manner. Finally, two outputs 8 and 9 of the measuring device 4 emit measurement signals, which are characteristic for the measured system currents and system voltages. These outputs 8 and 9 are also connected to the evaluation unit 7 in which the received measurement signals can be evaluated in accordance with the method according to the invention.

The method according to the invention begins with measuring the system current I and the system voltage U during a first preselected time interval T1, which is indicated in FIG. 3. A thin, dotted line indicates the system current I, whereas a thick, solid line indicates the system voltage U. A customary frequency of 50 Hz has been assumed, although in a corresponding modification, the invention can naturally also be used in other systems, e.g. with 60 Hz. At the beginning of a second preselected time interval T2 (FIG. 3), the controllable current source 3 then additionally impresses a testing current into the system, for example by virtue of an output 10 of the evaluation unit 7 sending a start signal, which initiates the impressing of the testing current. In the exemplary embodiment, the testing current is synchronously switched on and off again during a respective zero crossover of the system voltage and the system current, respectively. The testing current in the exemplary embodiment is composed of two periodic signals with the frequencies f1=40 Hz and f2=60 Hz, both of which deviate from the 50 Hz rated frequency of the system, thus causing the changes in the current and voltage progression or course that are shown in an exaggerated fashion in the time interval T2 in FIG. 3.

The measuring device 4 measures the currents and voltages during the two time intervals T1 and T2, which amount to a complete measurement cycle. These measurement values are used to carry out a Fourier analysis in the evaluation unit 7 in order, based on both the measurement values obtained without the testing current in time interval T1 and the measurement values obtained with the testing current in time interval T2, to determine the resulting impedance $Z_N$ of the energy supply system at the rated frequency. To this end, the method proceeds as follows:

First, the system current and the system voltage are measured during the time interval T1 and these are used to calculate the values $I_{T1}(t)$ and $U_{T1}(t)$. Then, (FIG. 3), the testing current is impressed with the frequencies f1 and f2, wherein $$I_{test} = I_{f1} \cdot \sin(2\pi f1 t) + I_{f2} \cdot \sin(2\pi f2 t),$$

which yields measurement values of the system current and the system voltage $I_{T2}(t)$ and $U_{T2}(t)$.

In the evaluation unit 7, a discrete Fourier transformation DFT is carried out, in which first, complex Fourier coefficients of the system current and the system voltage are determined in accordance with the following equations:

$$DFT(U_{T1}(t), f) = U_{T1}(f) = Re(U_{T1}(f)) + j \cdot Im(U_{T1}(f))$$

$$DFT(I_{T1}(t), f) = I_{T1}(f) = Re(I_{T1}(f)) + j \cdot Im(I_{T1}(f))$$

$$DFT(U_{T2}(t), f) = U_{T2}(f) = Re(U_{T2}(f)) + j \cdot Im(U_{T2}(f))$$

$$DFT(I_{T2}(t), f) = I_{T2}(f) = Re(I_{T2}(f)) + j \cdot Im(I_{T2}(f)).$$

In these equations, "Re" stands for the real components and "Im" stands for the imaginary components. In addition, the calculation is carried out separately for the two frequencies f1 and f2 and, as is apparent, is carried out separately for the time intervals T1 and T2, thus yielding a total of eight real components and eight imaginary components.

Based on the Fourier coefficients, a subtraction operation executed according to the following equations is then used to calculate the complex differences for the time intervals T1 and T2, which are characteristic for the changes in the system current and system voltage:

$$U_{DIFF}(f) = \text{Re}(U_{T2}(f)) - \text{Re}(U_{T1}(f)) + j[\text{Im}(U_{T2}(f)) - \text{Im}(U_{T1}(f))]$$

$$I_{DIFF}(f) = \text{Re}(I_{T1}(f)) - \text{Re}(I_{T2}(f)) + j[\text{Im}(I_{T1}(f)) - \text{Im}(I_{T2}(f))].$$

Here, too, separate procedures are used for the frequencies f1 and f2, thus yielding four respective real and imaginary components. These can be used in the following manner to calculate the complex system impedances:

$$Z_N(f) = \frac{U_{DIFF}(f)}{I_{DIFF}(f)},$$

which separately yields a respective value $Z_N$ (f1) and $Z_N$ (f2) for f1 and f2, from which the resulting system impedance at the system frequency $f_{SYSTEM}$ is derived by averaging:

$$Z(f_{SYSTEM}) = \frac{Z_N(f1) + Z_N(f2)}{2}.$$

In the exemplary embodiment, it is therefore possible to achieve a sufficiently precise calculation of the system impedance by averaging, particularly because the two testing frequencies f1, f2, for example 40 Hz and 60 Hz, are preferably selected to be symmetrically situated on either side of the system frequency $f_{SYSTEM}$. Alternatively, the testing frequencies can also be selected, for example, as f1=45 Hz and f2=65 Hz or f1=10 Hz and f2=100 Hz. In these cases, instead of using an averaging, the resulting system frequency can also be derived, for example, by means of a straight approximation based on the impedance values obtained for f1 and f2. It would be analogously possible to calculate the testing current from only a single periodic signal with only one frequency that deviates from the system frequency. In this case, the Fourier analysis could be carried out in a corresponding manner, wherein the equations given above would only have to be solved for one frequency each. In addition, only one value $$Z_N(f1) = \frac{U_{DIFF}(f1)}{I_{DIFF}(f1)}$$

would be obtained, which would render averaging and straight approximation impossible. However, since the complex impedances and therefore also the frequency progressions of the impedances are obtained, these can be used to calculate the impedance at the rated frequency.

In the description of the exemplary embodiment, it has also been assumed that sinusoidal testing currents are impressed and that the testing current is composed of sinusoidal signals. Even if being the best way however, this is not absolutely required because a triangular testing current, for example, could also be impressed, which for its part can be thought of as being comprised of a number of sinusoidal signals with various frequencies and therefore permits a Fourier analysis with one or more of these frequencies.

Each of the embodiments cases described above involves the advantage intended by the invention that even with the presence of frequency-dependent impedances, it is possible to determine the system impedance at the rated frequency of the system by first selectively determining impedances at frequencies not present in the system and from these, calculating the system impedance at the rated frequency by means of an approximation. For the respective testing frequencies used here, intermediate harmonic frequencies are preferably selected which also do not occur in the harmonic oscillations associated with the system frequency. This produces a determination method, which is largely free of interferences in the system and also yields sufficiently precise results particularly with the use of testing frequencies that are close to the rated frequency.

In order to be able to carry out an exact Fourier analysis, the time intervals T1 and T2 are preferably identical and are selected to begin and end with the same phase position so that the same phase positions for the phases can be achieved with and without the testing current. This is possible if T1 and T2 are at least as long as the lowest common multiple of the periods of the system frequency and the testing frequency or frequencies and therefore each of these periods occurs at least once in the time interval T2. At the system frequency of 50 Hz and testing frequencies of 40 Hz and 60 Hz, the following equations apply:

$T_{SYSTEM} = 1/f_{SYSTEM} = 20$ ms $t1 = 1/f1 = 25$ ms $t2 = 1/f2 = 16.667$ ms, from which it follows that the lowest common multiple in this instance is 100 ms (see FIG. 3). If t1=1/f1=22.222 ms (f1=45 Hz) and t2=1/f2=15.385 ms (f2=65 Hz), then this would yield a lowest common multiple of 200 ms, for example. In order to produce reasonable values here, the invention proposes selecting testing frequencies that lie between 9 Hz and 121 Hz.

Since the shutdown of the decentralized voltage sources should occur at the latest within five seconds of the system shutdown or system outage, the second time interval T2 is preferably no longer than 1 second. T1 can be selected to be correspondingly short so that a total measuring time of maximally 2 seconds is required. Actually, however, in the exemplary embodiment 200 ms is sufficient in order, when the evaluation unit 7 detects an impedance change of 0.5 Ω or more in the system, to generate a signal that can be used to shut down a decentralized voltage source and that can be emitted, for example, from an output 11 (FIG. 1) of the evaluation unit 7. It would therefore be sufficient to run through the 200 ms long measuring cycle once every five seconds.

The signal appearing at the output 11 can be generated in various ways. In the simplest case, the signal is a testing signal, which indicates the value for the system impedance determined in the evaluation unit 7, and a device associated with the decentralized voltage source checks whether or not the voltage source must be shut down. Alternatively, the signal can be a status signal, which indicates whether the system impedance is greater or less than a critical threshold value. In this case, the voltage source can be associated with a shutdown device that reacts to the status signal. Another possibility is comprised of generating a switching signal at the output 11, which deactivates the decentralized voltage source or disconnects it from the system in the event that the system impedance change has exceeded a critical threshold value of 0.5 Ω, for example. The particular manner in which the desired shutdown of the decentralized voltage source is executed can be made to depend on the requirements of the individual case.

The transmission of signals from the measuring device 4 to the evaluation unit 7 or from this evaluation unit 7 to the controllable current source can take place in an analog or digital fashion as necessary.

The apparatus described in conjunction with FIG. 1 is preferably produced in the form of a compact apparatus contained in a housing, as indicated by the line 12 encompassing it. In this instance, the outside of the housing is only provided with the connections, which are required to connect the current source 3 and measuring device 4 to the system, and with the output 11, which is designated for connection to a voltage source to be monitored and controlled.

FIG. 2, in which same parts are provided with the same reference numerals as in FIG. 1, shows an embodiment which is considered to be the best one up to now. A static current (power) converter 14 connected to the system in parallel, is connected to a decentralized direct-current source 15 such as a photovoltaic system, converts the direct current generated by this direct current source into alternating current, and feeds this current into the system. Current converters 14 of this kind can be thought of not only as controllable current sources, but also as a rule have means for detecting current or voltage measurement values, a set of power electronics, an electronic control unit 16 for these electronics, and means for regulating the amplitude and frequency of the current that is fed into the system. In such a case, therefore, components or structural groups, which are in principle already present in the current converter 14, can be used to produce the apparatus according to the invention.

As indicated in FIG. 2, the current source 3 according to FIG. 1, for example, is replaced by the current converter 14 according to FIG. 2 so that the apparatus according to the invention contains only the measuring device 4 and evaluation device 7, whose output 11 is connected to the control unit 16 of the current converter 14. Apart of this, the apparatus is contained in a housing 17, for example, and functions in the same way as the one in FIG. 1.

In the embodiment of FIG. 2, the testing current is impressed into the system by virtue of a testing current being superposed onto the base current generated by the current converter 14, which is supplied with electrical energy by the direct-current source 15. The superposition can occur, for example, by virtue of a desired value for the testing current being superposed onto the operationally required nominal current value of the current converter 14. During the time interval T2, therefore, the current converter 14 supplies the system with a base current, which is modified by the testing current. Therefore, the desired value for the testing current can be stored, for example, in an electronic memory of the current converter 14, or can be generated by this current converter 14 in some other way and be activated during the time interval T2. The activation can occur with the aid of a switching signal, which is emitted by the evaluation unit 7, indicates the beginning and end of the time interval T2, and appears at a second output 18 of the evaluation unit 7, for example.

In order for the changes in the system current and the system voltage caused by the testing current to experience the least possible interference due to the events occurring in the system, the measuring device 4 preferably contains either a band-stop filter matched to the rated frequency of the system or band-pass filters matched to the testing frequencies f1, f2. This largely prevents interference due to signals with frequencies other than the testing frequencies f1, f2.

According to a particularly preferred modification of the invention, a known testing impedance 19 (FIG. 2) with the value $Z_1$ is connected between the controllable voltage source 3 or 14 and the system, which testing impedance is connected in parallel with a switch 20 that can be controlled or switched on and off. A control input of this switch 20, for example, is connected to a third output 21 of the evaluation unit 7. The purpose of the test impedance 19 is to test the function of the apparatus according to invention from time to time.

Essentially, this proceeds as follows:

When the switch 20 is closed, the test impedance 19 is short-circuited. In this case, the apparatus operates in the above-described manner by measuring the system impedance 2. However, if the switch 20 is opened by means of a control signal sent by the evaluation unit 7, then the above-described apparatus measures the sum of the impedances 2 and 19, i.e. the value $Z_N + Z_1$. Since $Z_1$ is known, this measurement can be used as needed to test whether the test impedance 19 is accompanied by the expected $Z_1$ impedance jump and the apparatus is therefore operating properly.

In the above described exemplary embodiments, it was assumed that the control signals for the beginning and end of the testing current and for turning the switch 20 on and off are generated and sent directly by the evaluation unit 7. Alternatively, however, it would naturally also be possible to provide a control unit especially for this purpose.

Another preferred exemplary embodiment of the invention provides for an individual identification, e.g. a serial number or the like, to be associated with each device to which the above description applies. The identification is embodied so that when the testing current of this device is impressed, this identification is automatically fed along with it into the system and can then be recognized by other devices that are also connected to the system. Such an identification can be achieved, for example, by superposing a current with a very high frequency onto the testing current generated by the associated device; this high frequency is different for each device and does not interfere with either the desired measurement of the system impedance or the Fourier analysis carried out for this purpose. Alternatively, the apparatus could also be embodied in such a way that each device feeds a current flow, which is characteristic for the respective identification, into the system. The manufacturer can predetermine the identification for each individual device by storing it e.g. in a memory of the evaluation unit 7, by setting it by means of an encoded switch position, or by associating it in some other way. Correspondingly, in this case, the measuring device 4 or the evaluation unit 7 of each device is provided with a recognition device, which checks and analyzes the measured system current for the presence of such an identification.

If several decentralized voltage or current sources 3 or 14 are connected to the system in parallel, then the use of the above-described identifications and an additional simple control unit makes it possible to ensure that only a single device or a preselected number of associated devices impresses a testing current into the system at a particular time. This can prevent an unknown number of testing currents from being impressed into the system at any given time and thus generating false measurement results. In this connection, it would be possible, for example, to program the device so that a measurement cycle to be initiated by it and in particular, the time interval T2 to be initiated by it are enabled only if no other device is simultaneously impressing a testing current, or so that it suppresses the enabling of its own testing current as long as the testing currents of other devices are being impressed into the system. In other words, it is possible for each device, in the evaluation of its own impedance calculation, to take into account whether the testing currents of other devices have also been activated at the same time. Since the time intervals T1 and T2 according to the exemplary embodiment above are only 100 ms each, but a period of five seconds, for example, is available for shutting down the decentralized voltage source 15, theoretically twenty-five devices could be operated without two or more devices having to output testing currents at the same time. A particular advantage of the above-described process also lies in the fact that the various current sources can be operated independently of one another and without an overriding time control or the like.

The invention is not limited to the exemplary embodiments described, which can be modified in numerous ways. In particular, the above-described apparatuses can be used for monitoring and/or shutting down system suppliers other than the photovoltaic ones described. As shown in FIGS. 1 and 2, in principle, it makes no difference whether the various components or functions of the apparatuses are totally or in part already present in the respective system supplier or have to be additionally incorporated into or implemented in them. Also, the network impedance calculating method used in the individual case can be different from the one described, to which end each evaluation unit 7 is suitably equipped with the required computers (microcontrollers, processors, or the like) and the associated software. It is also clear that the methods and apparatuses described in conjunction with a single-phase system can be used analogously in three-phase systems by virtue of each phase being associated with its own device or a single existing device being connected to each of the three phases in alternating succession. It is also possible to transmit the data emitted by the evaluation unit 7 at the output 11 through the system to a central control point and/or to other devices. Conversely, the central station can transmit information or control signals to one or more devices via the system. By means of this, all of the devices and the voltage sources connected to them can be shut down as needed from a central station or status signals can be sent to the central station by all of the connected devices. The transmission takes place, for example, by means of a high-frequency modulation of the system voltage with the aid of power line modems (bi-directional power line communication). Finally, it goes without saying that the various features can also be used in combinations other than those depicted and described.

It will be understood that each of the elements described above, or two ore more together, may also find a useful application in other types of devices of equal-rated operation differing from the types described above.

While the invention has been illustrated and described as embodied in a device for measuring the impedance of an electrical supply system it is not intended to be limited to the details shown, since various modifications and changes may be made without departing in any way from the spirit of the present invention.

Without further analysis, the forgoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for measuring the impedance of a live energy supply system at a rated frequency by impressing a testing current into the system and measuring the resulting changes in the system current and the system voltage, comprising the steps of measuring said system current and said system voltage during a first time interval (T1) without the impressing of said testing current and during a second time interval (T2) with the impressing of said testing current, composing said testing current of at least one periodic signal with at least one testing frequency that deviates from said rated frequency and the harmonics of this rated frequency, using, based on said measured system currents and system voltages, a Fourier analysis in such a way that complex Fourier coefficients of system current and voltage are respectively determined for the two time intervals (T1, T2) and all testing frequencies, complex differences between T1 and T2 of these coefficients are used to calculate the impedances at all testing frequencies, and deriving the impedance of the energy supply system at the rated frequency from said impedance or impedances obtained for all testing frequencies.

2. The method according to claim 1, wherein said two time intervals (T1, T2) are at least as long as the lowest common multiple of a period of sad system frequency and periods of said testing frequencies.

3. The method according to claim 1, and further letting occur said impressing of said testing current and said resulting changes at a same phase position as said measurement of said system current and said system voltage without said impressing of said testing current.

4. The method according to claim 1, wherein a desired value of said testing current is superposed onto a desired value of a current of rated frequency which is generated in a current converter connected in parallel to said system.

5. The method according to claim 4, wherein said desired value of said testing current is transmitted to said current converter (14) by an independent evaluation unit (7).

6. An apparatus for measuring the impedance of a live energy supply system at a rated frequency, comprising means (3, 14) for impressing a testing current into said system, a measuring device (4) for measuring a system current, a system voltage, and changes in said system current and said system voltage caused by the impressing of said testing current, and an evaluation unit (7) connected to said measuring device (4), wherein said system current and said system voltage are measured during a first time interval (T1) without the impressing of said testing current and during a second time interval (T2) with the impressing of said testing current, composing said testing current at least one periodic signal with at least one testing frequency that deviates from said rated frequency and the harmonics of this rated frequency, using, based on said measured system currents and system voltages, a Fourier analysis in such a way that complex Fourier coefficients of system current and voltage are respectively determined for the two time intervals (T1, T2) and all testing frequencies, complex differences between T1 and T2 of these coefficients are used to calculate the impedances at all testing frequencies, and deriving the impedance of the energy supply system at the rated frequency from said impedance or impedances obtained for all testing frequencies.

7. The apparatus according to claim 6, wherein said current converter (14) causes said system current to track a desired current value and said testing current is generated by correspondingly changing of said desired current value.

8. The apparatus according to claim 7, wherein said desired value of said testing current can be generated in said current converter (14) and can be switched on and off in response to signals from said evaluation unit (7).

9. The apparatus according to claim 7, wherein said desired value of said testing current can be stored in a memory of said static power converter (14) and can be switched on and off in response to signals from said evaluation unit (7).

* * * * *